(12) United States Patent
Baird et al.

(10) Patent No.: US 9,092,755 B2
(45) Date of Patent: Jul. 28, 2015

(54) SYSTEM AND METHOD FOR ADDING ITEMS IN A STRUCTURED DOCUMENT

(75) Inventors: Peter J. Baird, Arlington, MA (US); Robert S. Shaver, Watertown, MA (US)

(73) Assignee: Adobe Systems Incorporated, San Jose, CA (US)

( * ) Notice: Subject to any disclaimer, the term of this patent is extended or adjusted under 35 U.S.C. 154(b) by 361 days.

(21) Appl. No.: 13/149,550

(22) Filed: May 31, 2011

(65) Prior Publication Data

US 2013/0132831 A1  May 23, 2013

(51) Int. Cl.
*G06F 3/048* (2013.01)
*G06Q 10/10* (2012.01)
*G06F 17/24* (2006.01)

(52) U.S. Cl.
CPC ................ *G06Q 10/10* (2013.01); *G06F 17/24* (2013.01)

(58) Field of Classification Search
CPC ....................................................... G06F 3/048
USPC .......................................... 715/255, 810, 830
See application file for complete search history.

(56) References Cited

U.S. PATENT DOCUMENTS

| | | | | |
|---|---|---|---|---|
| 5,745,103 | A * | 4/1998 | Smith | 345/601 |
| 6,233,726 | B1 * | 5/2001 | Bowman et al. | 717/107 |
| 6,246,411 | B1 | 6/2001 | Strauss | |
| 6,938,205 | B1 * | 8/2005 | Hanson et al. | 715/234 |
| 6,970,749 | B1 | 11/2005 | Chinn et al. | |
| 7,188,309 | B2 * | 3/2007 | Simmons et al. | 715/244 |
| 7,218,329 | B2 | 5/2007 | Ueda | |
| 7,703,084 | B2 * | 4/2010 | Lindhorst et al. | 717/136 |
| 7,853,889 | B1 * | 12/2010 | Yanchar et al. | 715/777 |
| 8,250,486 | B2 * | 8/2012 | Lentz | 715/828 |
| 8,341,529 | B1 * | 12/2012 | Li et al. | 715/741 |
| 2002/0168106 | A1 * | 11/2002 | Trajkovic | 382/170 |
| 2003/0063126 | A1 * | 4/2003 | Yanchar et al. | 345/781 |
| 2004/0174396 | A1 | 9/2004 | Jobs et al. | |
| 2006/0112341 | A1 * | 5/2006 | Shafron | 715/733 |
| 2008/0148146 | A1 * | 6/2008 | Estrada et al. | 715/255 |
| 2009/0006646 | A1 * | 1/2009 | Duarte | 709/236 |
| 2010/0185966 | A1 * | 7/2010 | Jette et al. | 715/768 |
| 2010/0205529 | A1 * | 8/2010 | Butin et al. | 715/704 |
| 2010/0299614 | A1 * | 11/2010 | Hangas et al. | 715/752 |
| 2012/0151375 | A1 * | 6/2012 | Lin et al. | 715/741 |
| 2012/0290925 | A1 * | 11/2012 | Atkins et al. | 715/243 |
| 2013/0132831 | A1 * | 5/2013 | Baird et al. | 715/255 |
| 2014/0297516 | A1 * | 10/2014 | Brown et al. | 705/39 |

FOREIGN PATENT DOCUMENTS

WO  2005015358 A2  2/2005

* cited by examiner

*Primary Examiner* — Cesar Paula
*Assistant Examiner* — Mohammed-Ibrahim Zuberi
(74) *Attorney, Agent, or Firm* — Wolfe-SBMC (57) ABSTRACT

Methods and apparatus for providing a document authoring application. A palette comprising a plurality of editing controls may be displayed within the canvas that is associated with an electronic document having an associated structure. The palette may be positioned within the canvas based at least in part on the associated structure of the electronic document. Responsive to selections of editing controls at the palette, documents objects may be added to the canvas. The palette may be repositioned within the canvas based at least in part on the structure associated with the electronic document.

21 Claims, 10 Drawing Sheets

| Design | Test | Distribute ⊖ | View Responses | Upgrade |

Georgia ▼ | 14 ▼ | B *I* U | A ▼ | ≡ ≡ ≡ ≡ | Labels on Top ▼ | 🎨□ ▼

Feedback Form

*Here at Local it is our duty to serve you, the customer, and we take your feedback very seriously. Whether negative or positive, let us know about your experience*

First Name*
[ ]

Last Name*                                                          *210*
[ ]

Please provide your feedback on the quality of our service
○ Excellent
○ Very Good  — 236c
○ Good
○ Average ⊗ ⊕
○ Poor  ⊕                                                            *230c*

FIELD PROPERTIES
[ Single Selection ▼ ]
☑ Stack Choices Vertically
☐ Include "Other" Choice
☐ Required
☐ Include Help Text

232

Do you have suggestions on what we can do to provide you with a better service?
[                                                                    ]
                                                                     *230d*

E-mail Address
[            ] — 230e

SYSTEM AND METHOD FOR ADDING ITEMS IN A STRUCTURED DOCUMENT

BACKGROUND

The present disclosure relates generally to presentation of information within a graphical user interface, and more specifically to presentation of controls and objects within a structured document.

Document authoring software applications may be used to facilitate creation and updating of electronic documents (e.g., web pages, multimedia presentations) by users that may lack proficiency in technical aspects of document creation. For example, one document authoring application may provide a graphical interface that provides selectable controls allowing a user to edit web pages by adding and updating graphical objects corresponding to web page objects in a "what you see is what you get" manner. Use of such an authoring application may allow a user to add and update creative aspects of web pages, without requiring that the user have knowledge of the actual code (e.g., markup languages) used to define the web page. Such authoring applications may employ structured documents (e.g., forms).

Various configurations may be employed within a user interface to provide a user with access to computer program application controls. Examples of methods for presenting application controls for selection by a user include toolbars, pull-down menus, and dialog boxes. Palettes may also be used to present application controls to the user in an efficient manner. For example, a palette may include a sub-window within an application, and may includes a plurality of controls relating to a specific task or group of related tasks (e.g., adding various objects, performing various updating tasks on objects).

SUMMARY

Various embodiments of methods and apparatus for providing a document authoring application are described. Embodiments may display a canvas associated with an electronic document having an associated structure. A palette comprising a plurality of editing controls may be displayed within the canvas. The palette may include two or more controls that correspond to addition of objects to the canvas. The palette may be positioned within the canvas based at least in part on the associated structure of the electronic document. The various embodiments may also provide for adding a particular object to the canvas in response to receiving an indication of a selection of one of the plurality of editing controls of the palette. The particular object may be positioned within the canvas based at least in part on the structure associated with the electronic document. The palette may be repositioned within the canvas based at least in part on the structure associated with the electronic document.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a computer system positioning a palette at a "first" location does not preclude scenarios in which the palette has been previously positioned at other locations, unless otherwise specified. Similarly, a "second" feature does not require that a "first" feature be implemented prior to the "second" feature, unless otherwise specified.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

High-Level Operations of the Document Authoring Application

Figure 1:
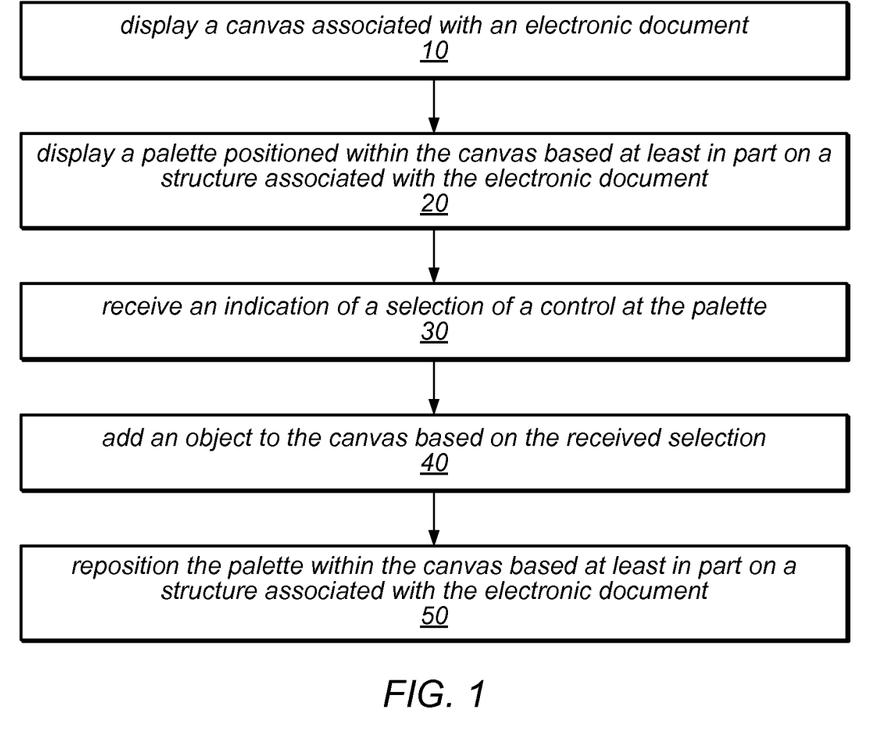
FIG. 1 is a high-level flowchart of a method of operation of a document authoring module employing a palette for use in defining document objects, according to at least some embodiments.

FIG. 1 is a high-level flowchart of a method of operation of a document authoring application employing a palette for use in defining document objects, according to at least some embodiments. As indicated at 10, a canvas associated with an electronic document being manipulated using the document authoring application may be displayed. A structured electronic document configured to provide a web page may be edited (e.g., created, updated) using some embodiments of the document authoring application. In some embodiments, the electronic document may be defined using a markup language (e.g., HTML, XML, XHTML, SGML). Other structured electronic documents (e.g., non-web page forms) may be created or modified using some embodiments.

In some embodiments, a canvas associated with the electronic document may correspond to the document page(s) and document objects (e.g., text, labels, selection controls, images) included within the electronic document. For example, a canvas associated with a web page may include areas corresponding to the rendered web page, including document objects corresponding to the text fields, labels, drop down selections, radio buttons, and/or other informational and control objects that are part of the web page. As used herein, the term "document object" includes the various components positioned within the canvas that relate to components that are rendered on the associated electronic document. The term "document object" does not refer to the palette.

As indicated at 20, a palette may be displayed within the canvas. For example, a palette that that presents one or more selectable controls relating to a specific task (or set of related tasks) to the user of the document authoring application may be depicted within the boundaries of the canvas. In various embodiment directed to creating and updating web page forms, the palette may include editing controls corresponding to the addition of document objects relating to components such as, for example, labels, images, text field controls, date field controls, various selection controls, and/or links to functionality (e.g., email, comments) of a web page produced using the document authoring tool. In some embodiments, the palette may include editing controls corresponding to updating previously added controls, such as modifying text, size, color, etc.

The palette may be positioned at a location within the canvas that is proximate to an area of interest. For example, based at least in part on a structure associated with the electronic document, the palette may be positioned near the location at which a next object will likely be added. As discussed in further detail below, such positioning of the palette may present the palette's various editing controls (e.g., object addition controls) to the user as being displayed near the area of the canvas at which corresponding added document objects will be placed. Therefore, required eye movement and input device movement may be minimized, and the user's attention may be focused directly to an area at which document objects are added and updated. In some embodiments, the user may be able to manually relocate the palette subsequent to the aforementioned automatic positioning of the palette. Some of these embodiments may automatically reposition the palette to an appropriate location in response to a subsequent user selection of an editing control. In other embodiments, manual relocation of the palette may not be allowed.

As shown at 30, an indication of a user selection of an editing control at the palette may be received. The indication of the user selection may result from the user selecting one or more of the palette's editing controls using, for example, an input device (e.g., mouse, track ball, touch screen, voice recognition). As indicated at 40, a particular object corresponding to the user-selected editing control may be added to the canvas in response to receiving the user selection. As one example, a user selection of an "add pull-down selection list box" editing control from the palette may cause a pull-down selection list box document object to be added to the canvas for inclusion on a corresponding electronic document. Thus, an electronic document may be created without requiring that the author have knowledge of the programming language defining the electronic document (e.g., markup language code defining a web page).

As indicated at 50, the palette may be repositioned within the canvas based at least in part on the structure associated with the electronic document. As an example, a user may select an edit control from the palette that corresponds to addition of a radio button control document object. In this example, the radio button control document object may be added below the other document objects of the canvas (e.g., at the location previously occupied by the palette). The palette may be relocated to a lower position at the canvas that corresponds to a location at which a next document object will likely be added. Thus, based on the structure of the electronic document, the palette may be relocated such that subsequent eye movement and input device movement may be minimized.

Figure 2:
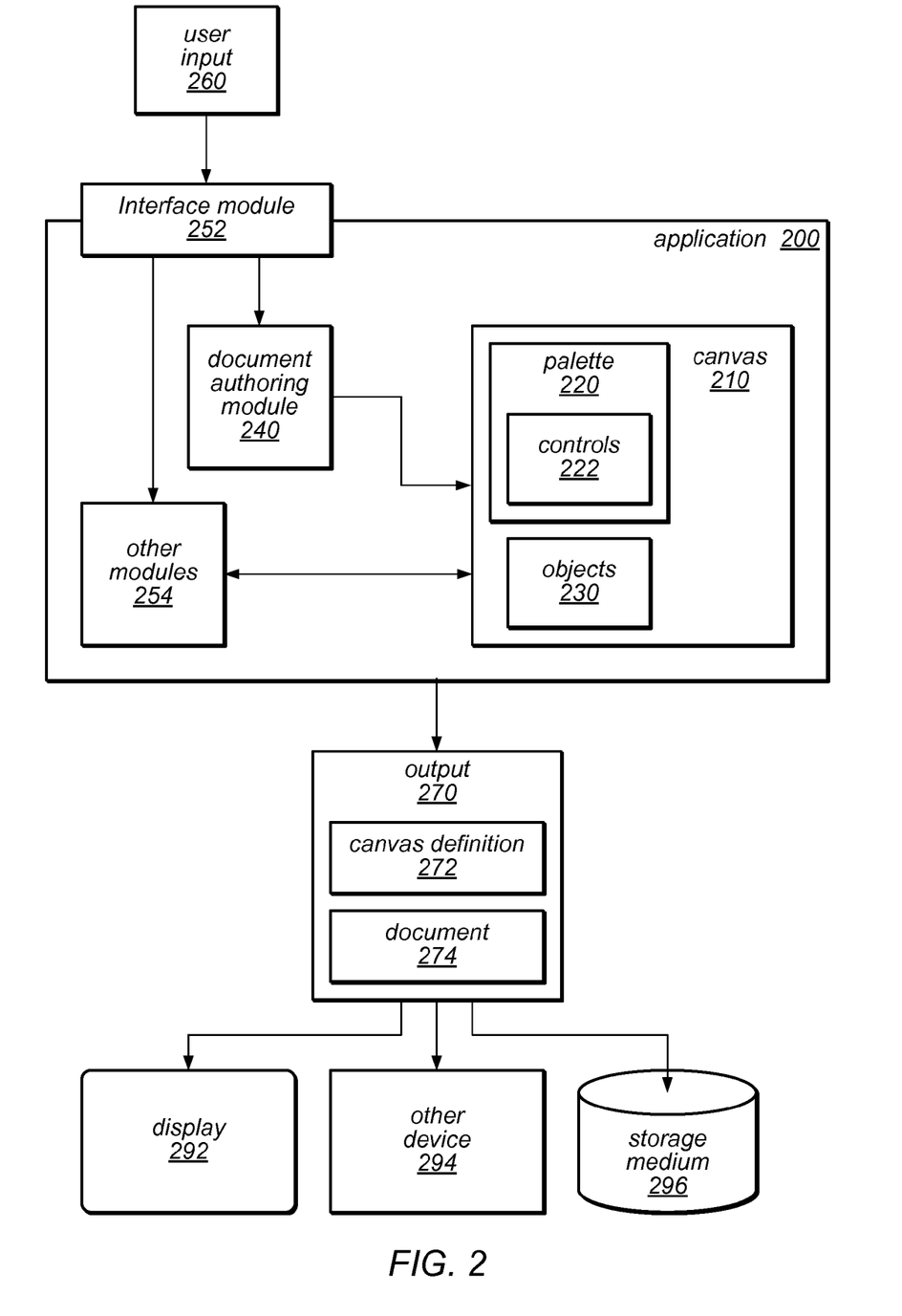
FIG. 2 illustrates an exemplary implementation of a document authoring module.

FIG. 2, discussed in greater detail below, depicts an example implementation of a document authoring module.

Positioning and Repositioning the Palette

Figure 3:
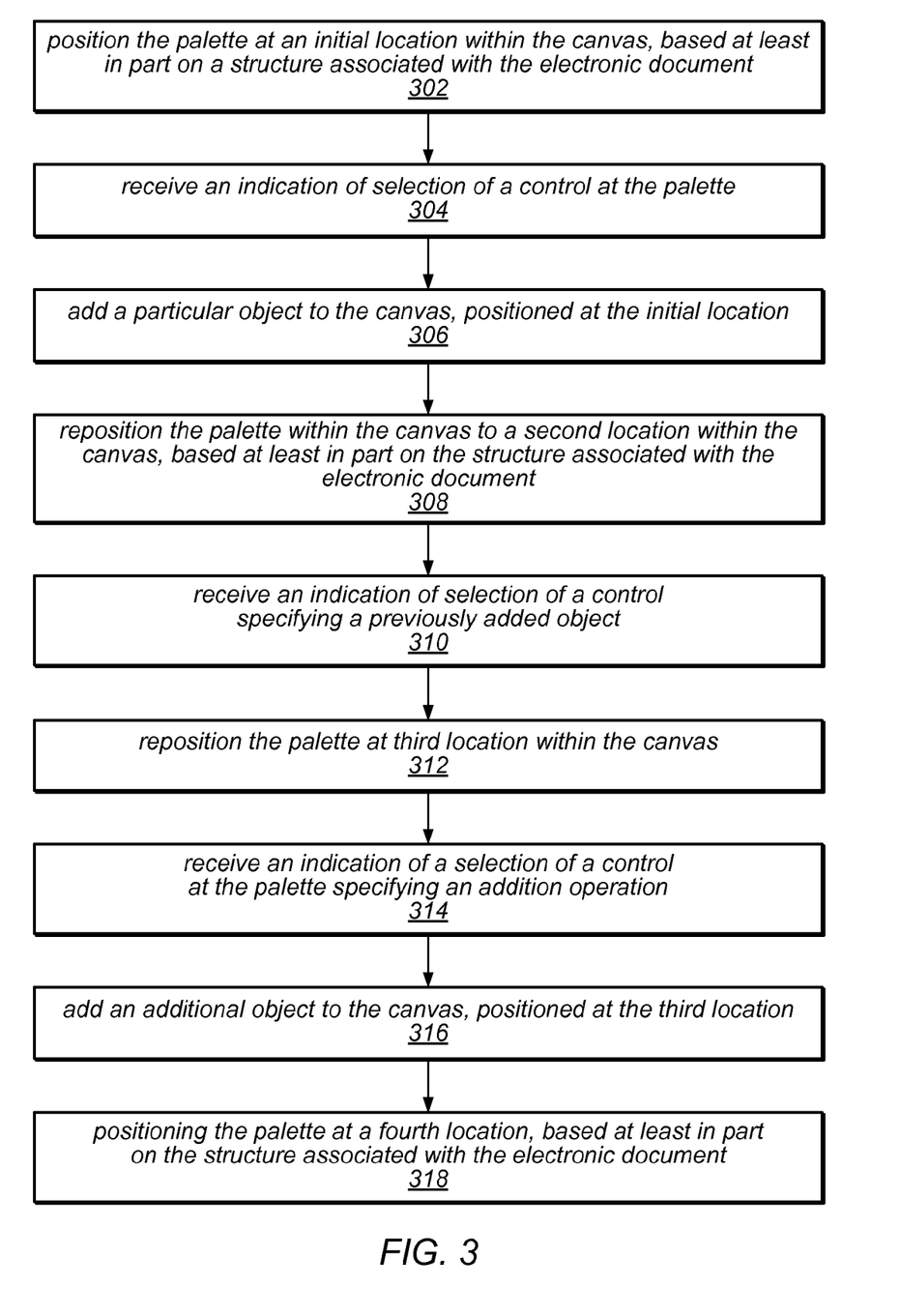
FIG. 3 is a flowchart of a various operations for positioning a palette, and for positioning various document objects, according to at least some embodiments.

FIG. 3 depicts various operations that particular embodiments of the present disclosure may practice in positioning a palette and various document objects within a canvas. As indicated at 302, a palette may be positioned at a first location within the canvas. As discussed above, this position may be determined based at least in part on a structure associated with the document corresponding to the canvas. For example, a document structure may provide for a plurality of document objects oriented in particular orientations, such as, for example, vertically arranged (e.g., sequentially "stacked" from top to bottom), horizontally arranged, arranged by some pattern, or some combination.

The first location on the canvas, which may correspond to a position at which a next added document object will likely be placed, may be based on a "last document object" on the canvas, such as a document object occupying the sequentially-latest position defined by the structure. For example, in some embodiments having an associated document structure that includes document objects arranged from the top of the document to the bottom, the latest document object may be the bottom-most vertically positioned document object among the document objects on the canvas.

In some embodiments, the latest document object may not necessarily correspond to the document object that was added last in time, as some embodiments may provide for inserting document objects between previously added document objects. For example, consider a canvas corresponding to an electronic document having an associated structure as depicted in table form below. The table represents a structure defining a sequence of positions 1, 2, 3, 4, and 5, where document objects A, B, and C respectively occupy positions 1, 2, and 3.

| 1 | 2 | 3 | 4 | 5 |
|---|---|---|---|---|
| A | B | C |   |   |

In this example, document object C corresponding to position 3 of the associated structure is the latest document object. Subsequently, document object D may be inserted between document objects A and B, resulting in document objects A, D, B, and C to respectively correspond to positions 1, 2, 3, and 4 of the associated structure, as depicted in the table below.

| 1 | 2 | 3 | 4 | 5 |
|---|---|---|---|---|
| A | D | B | C |   |

In this case, document object C corresponding to position 4 is now be the latest document object, as it corresponds to the latest sequentially-defined occupied position of the associated structure (position 4). Document object 3, which was later inserted, corresponds to an earlier sequentially-defined position of the associated structure (position 2). In this example, position 5 corresponds to the position to which a next added document object would correspond, in response to an addition operation (in contrast to an insertion operation, which may insert a new document object at other positions and cause adjustment accordingly, or an update operation with may replace an existing document object with another).

In some embodiments, the next location on the canvas, in accordance with the associated structure, may not be below the bottom-most document object on the canvas. For example, a canvas may be associated with a document structure specifying that a next position for an added document object may be adjacent, but not below the last document object on the canvas (e.g., horizontally adjacent, directly above, otherwise adjacent). In some embodiments, the next position for an added document object in accordance with an associated document structure may be near, but not adjacent to the probable object placement location.

The above-discussed placement of the palette within the canvas, based at least in part on the structure of the electronic document associated with the canvas, may present the palette proximate to the area of the canvas at which added document objects will be placed. Thus, eye movement and input device movement required by a user of a document authoring application may be minimized because edit controls for adding document objects may be provided by a palette that is located at or near the document object placement locations. For example, as indicated at 304, embodiments of the present disclosure may receive an indication of a selection of an edit control at a palette (e.g., relating to a mouse click), and a corresponding particular document object may be added to the canvas at or near the palette location, as indicated at 306.

As indicated at 308, in some embodiments the palette may be repositioned within the canvas to a second location based at least in part on the structure associated with the electronic document. For example, the above discussed addition of a document object may in some cases coincide with a repositioning of the palette to a second location that is proximate to the area of the canvas at which a subsequently added document objects will be placed (e.g., repositioning to the next location sequentially after the latest document object).

As noted above, various ones of the present embodiments may also provide for insertion of document objects at locations within the palette that are not the next location sequentially after the latest document object per the associated document structure. In some of these embodiments, an indication of a selection of a previously added object within the canvas may be received, as noted in 310. The palette may be subsequently repositioned to a third location that is proximate to the selected added object. For example, as indicated in 312, a selection of a control indicating an insertion of a new control above existing document object B may result in the palette being relocated above document object B, thereby placing the palette at or near a location at which a new document object will be inserted. A user's pointing device and eye movement may be minimized by placing the edit controls of the palette at or near the location of immediate interest.

As shown in 314, embodiments of the present disclosure may receive an indication of a selection of an edit control at a palette, and a corresponding particular document object may be added to the canvas at or near the third location, as indicated at 316.

As indicated at 318, in some embodiments, the palette may be repositioned within the canvas to a fourth location based at least in part on the structure associated with the electronic document. For example, the above discussed insertion of a document object may in some cases coincide with a repositioning of the palette to a fourth location that is proximate to the area of the canvas at which a subsequently added document objects will be placed (e.g., repositioning to the next location sequentially after the latest document object).

Various ones of the present embodiments may reposition the palette independently, without regard to the trajectory of the pointing device, or other input device. For example, placement of the palette may be dependent on a selection of a particular editing control or document object and a structure associated with a document, without having any dependency on the actual path followed by the pointing device or cursor. Thus, in these embodiments, pointing device (e.g., mouse) movement other than location at a time of button selection may be irrelevant as to palette placement.

EXAMPLES

Figure 4A:
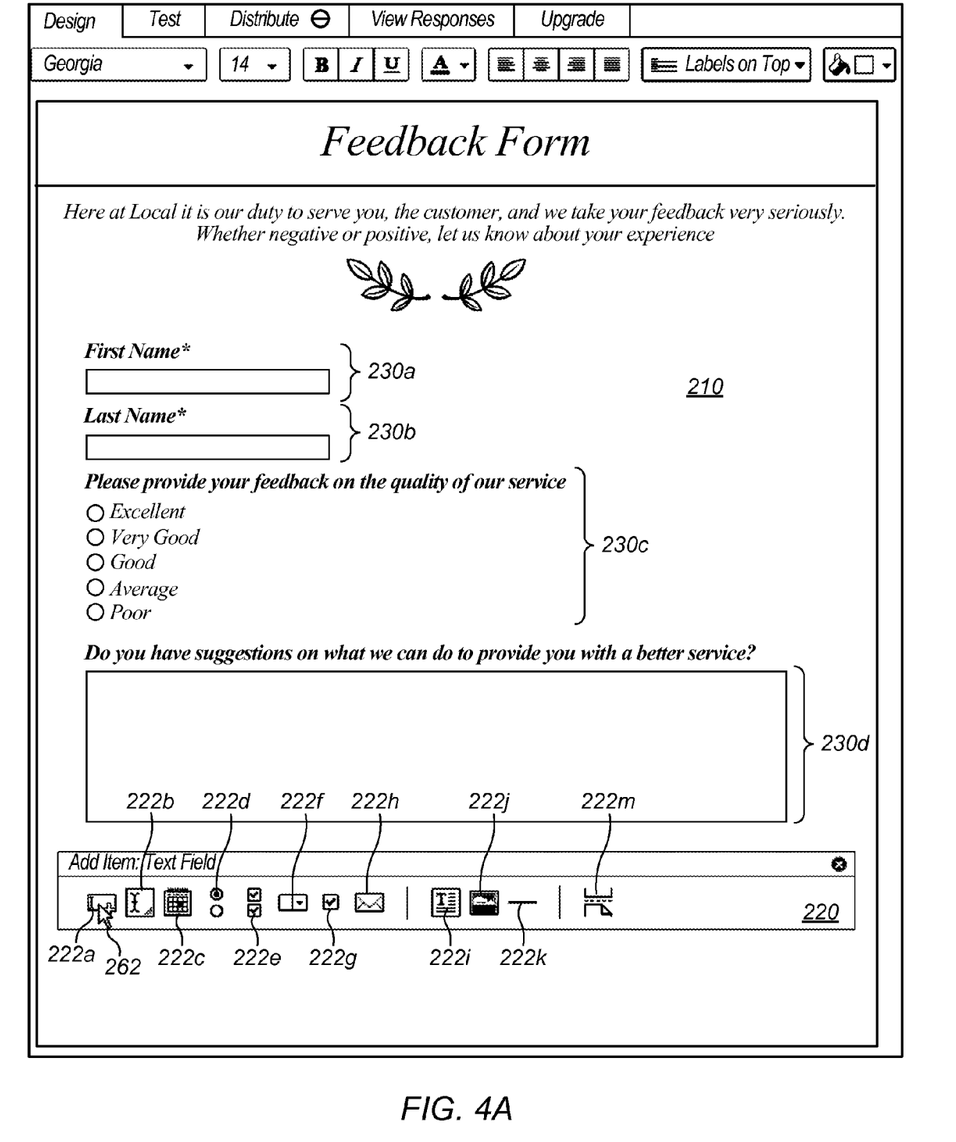
FIG. 4A illustrates an example of a graphical user interface provided by one embodiment of a document authoring application. A canvas, corresponding to an electronic document that provides a "Feedback Form," includes various document objects. Various editing controls are displayed to the user as part of a palette. In the depicted embodiment, the palette is displayed within the canvas, below four previously added document objects. The cursor is positioned to select a control that adds a "Text Field" object to the canvas.

FIG. 4A depicts an example screen capture of a document authoring tool being employed to edit a canvas corresponding to a "Feedback Form" electronic document. Canvas 210 includes various titles and text, as well as document objects 230. Palette 220 is positioned for display to the user within canvas 210, and includes various edit controls 222. Palette 220 of the embodiment illustrated in FIG. 4A includes text field edit control 222a, multi-line text field edit control 222b, date field edit control 222c, single-choice edit control 222d, multi-choice edit control 222e, drop down menu edit control 222f, check box edit control 222g, e-mail edit control 222h, formatted text edit control 222i, image edit control 222j, horizontal line edit control 222k, and new page edit control 222m. Other embodiments may have canvas 210 that includes additional edit controls, fewer edit controls, and/or other edit controls. In some embodiments, edit controls 222 presented to the user of the document authoring tool at palette 220 may vary depending on a current context. For example, palette 220 may be dynamically updated in some embodiments to present differing edit controls 222, based on currently highlighted document objects.

Figure 4B:
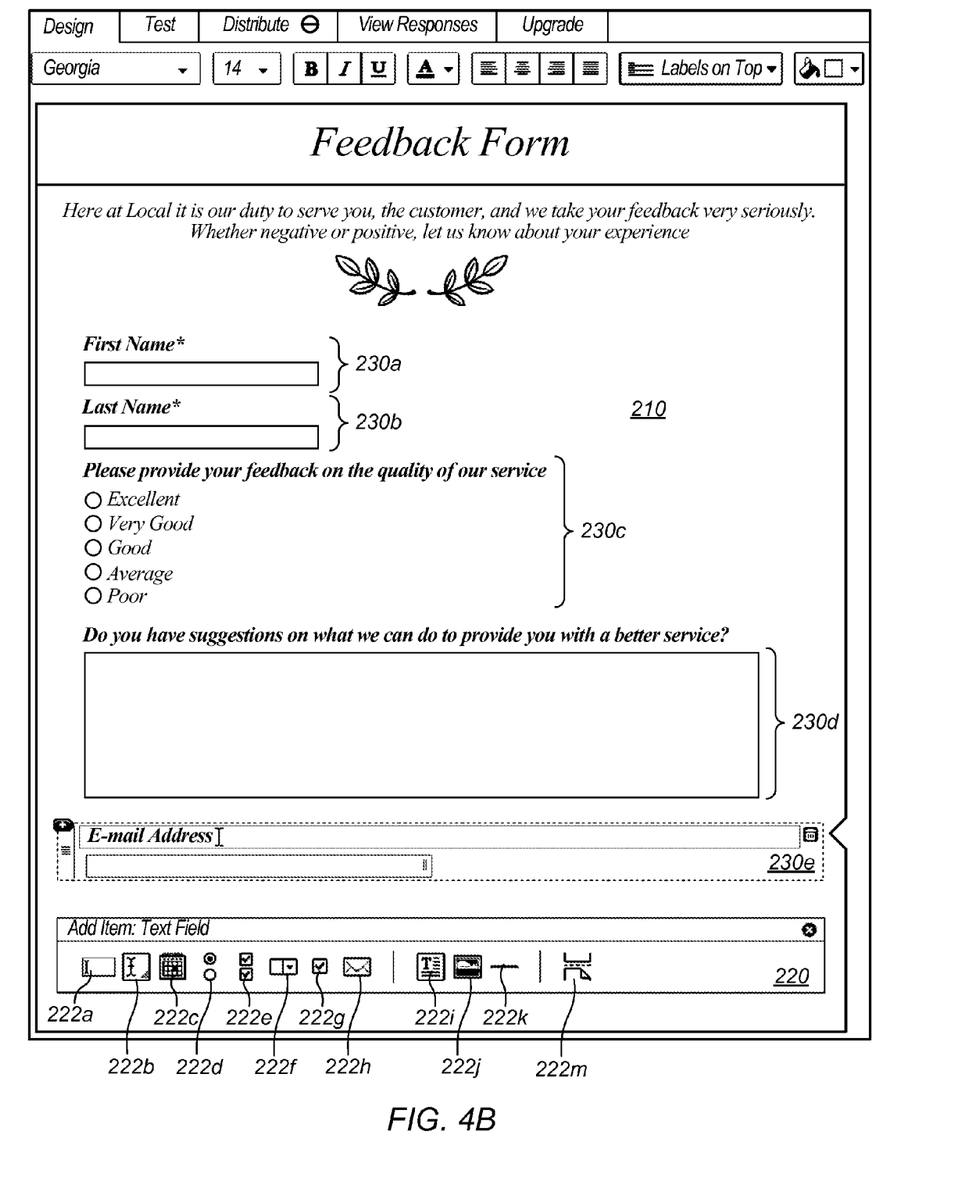
FIG. 4B illustrates one further exemplary use of the document authoring application depicted in FIG. 4A. A "Text Field" object has been added to the canvas below the four previously added document objects, with the notation "E-mail Address." The palette has been repositioned below the added "E-mail Address" text field object.

Cursor 262 is depicted in FIG. 4A as being positioned to select text field edit control 222a that is configured to add a "Text Field" object to the canvas 210. FIG. 4B illustrates addition of e-mail address text field object 230e to canvas 210 in this exemplary embodiment, in response to the selection of text field edit control 222a. In accordance with the structure of the document associated with the canvas 210 (e.g., a vertically-oriented list of document objects), e-mail address text field object 230e is added below and adjacent to comment field object 230d, which was the latest (sequentially latest as defined by the associated structure) document object of canvas 210. As shown in FIG. 4A, palette 220 was positioned below and adjacent to comment field object 230d prior to the addition of e-mail address text field object 230e. Thus, e-mail address text field object 230e is added at or near the prior position of palette 220. Palette 220 is shown as being relocated to a position adjacent and below e-mail address text field object 230e, in accordance with the associated structure of the document. In other embodiments, palette 220 may be relocated to locations other than adjacent and below e-mail address text field object 230e, in accordance with other definitions of the associated document structures.

Figure 4C:
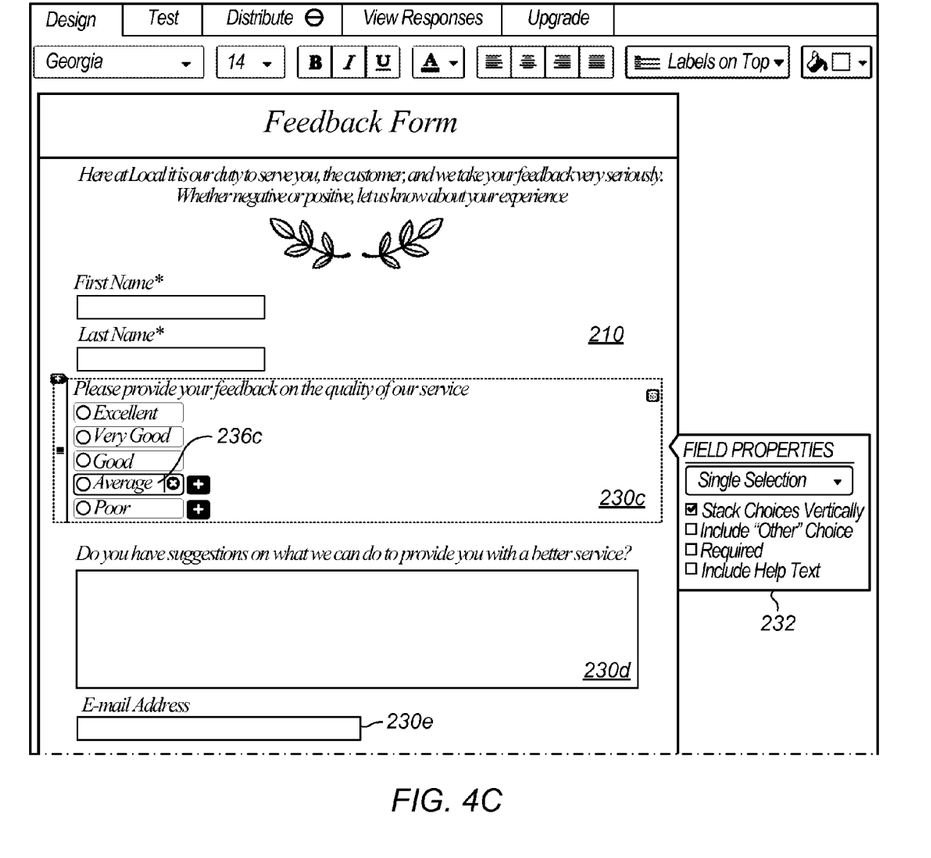
FIG. 4C illustrates one further exemplary use of the document authoring application depicted in FIG. 4B. A single-selection document object configured to receive service quality feedback has been selected for updating. Specifically, the selection annotated as "Average" is being updated.

FIG. 4C depicts an example of editing of object field 236c of single choice object 230c, subsequent to receiving a user selection of single choice object 230c for updating. Updating palette 232 is presented horizontally adjacent to single choice object 230c to facilitate updating of the components of previously existing single choice object 230c. Updating palette 232 may include editing controls that are the same or different from those available in palette 220. For example, updating palette 232 may include controls that facilitate deletion of document objects, updating of document object types, and/or updating of document object attributes. In the example shown, the annotation of object field 236c of single choice object 230c is being updated. In some embodiments, updating palette 232c may be presented at differing locations, such below or above single choice object 230c that is undergoing updating.

Figure 4D:
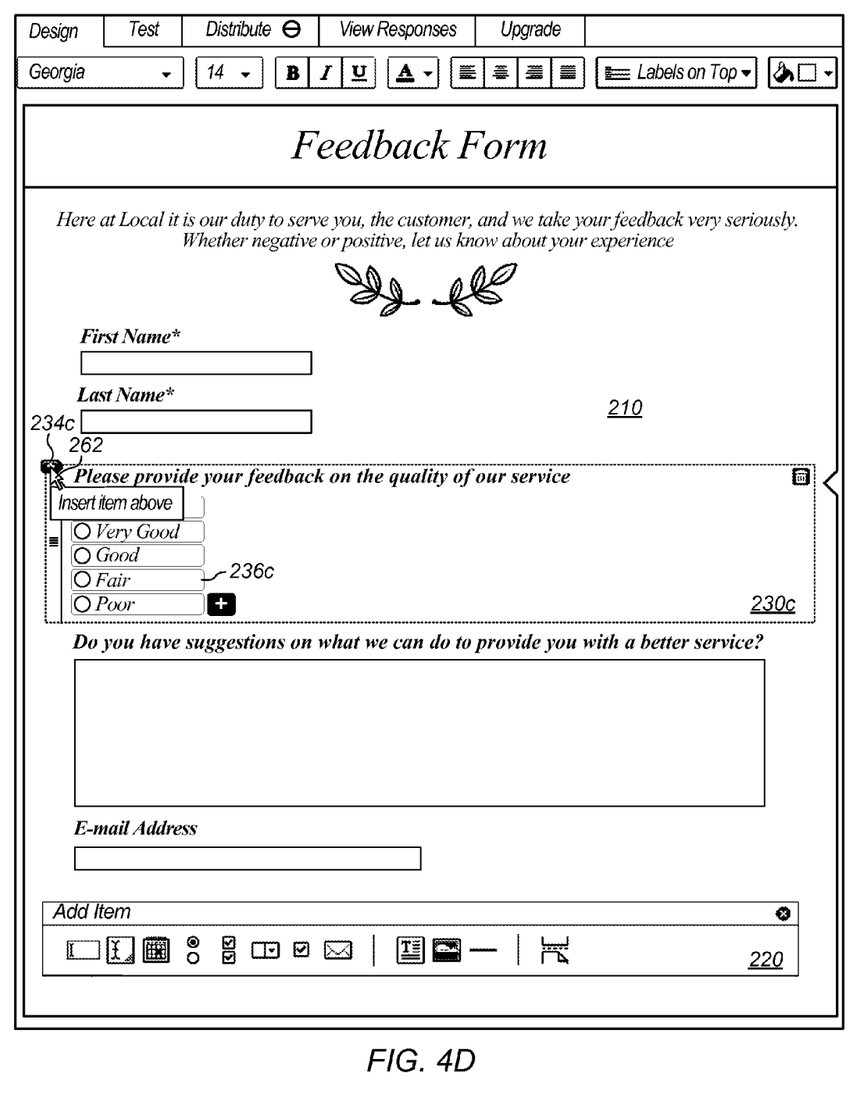
FIG. 4D illustrates one further use of the exemplary document authoring application depicted in FIG. 4C. The selection previously annotated as "Average" has been updated to "Fair." The cursor is positioned to select a control indicating insertion of an object above the single selection document object.

FIG. 4D depicts object field 236c subsequent to the updating of single choice object 230c, as shown in FIG. 4C (updating the annotation from "Average" to "Fair"). Cursor 262 is shown as being positioned to subsequently select item insertion control 234c to provide for inserting a document object above single choice object 230c.

Figure 4E:
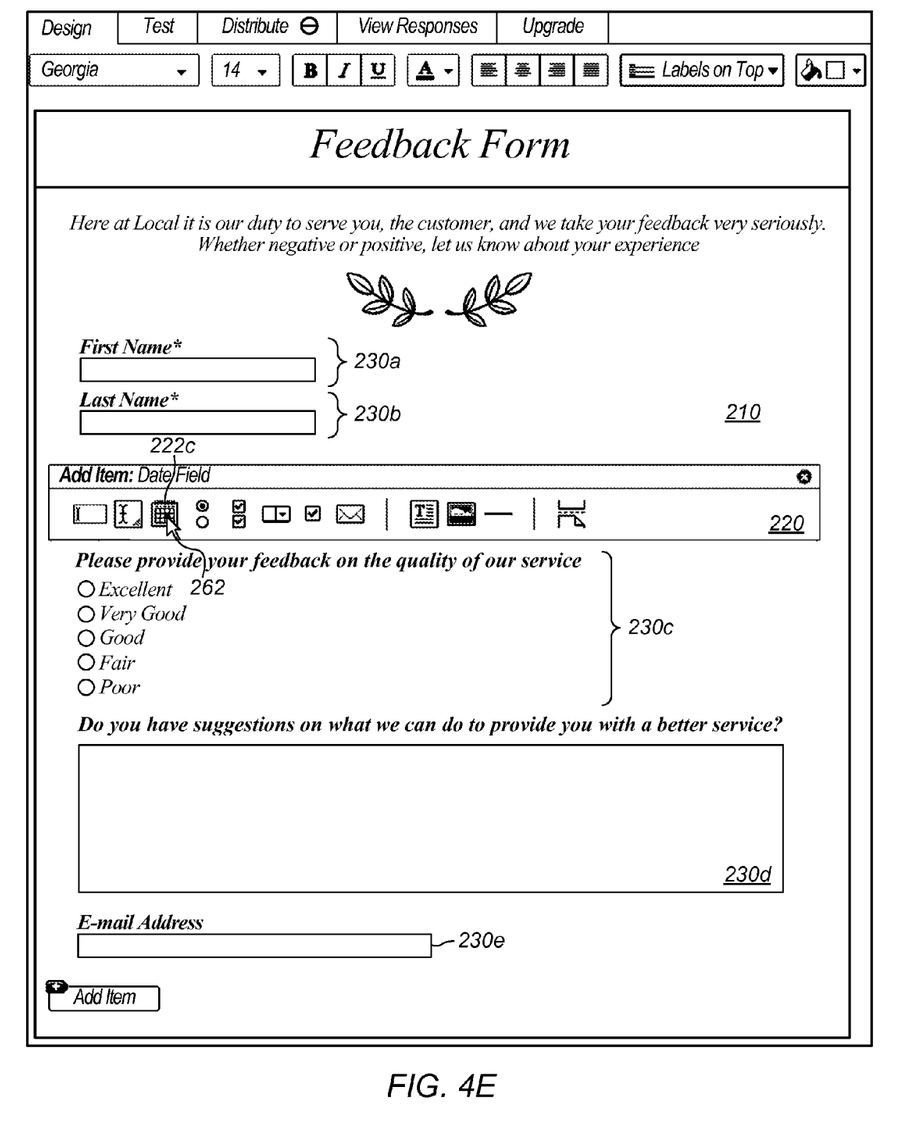
FIG. 4E illustrates one further use of the exemplary document authoring application depicted in FIG. 4D. The palette has been repositioned above the single selection document object in response to selection of the control indicating object insertion shown in FIG. 4D. The cursor is positioned to select a control that adds a "Date Field" to the canvas.

FIG. 4E depicts repositioning of palette 220 in response to the selection of item insertion control 234c, as depicted in FIG. 4D. In response to the selection of item insertion control 234c indicate insertion of a document object above single choice object 230c, palette 220 is repositioned above single choice object 230c. This positioning of palette 220 to a location at or near the indicated insertion point of the document object to be added reduces cursor movement and eye movement requirements, thereby allowing the document author to focus attention at the specific area of interest within the workspace. Cursor 262 is depicted as being positioned to subsequently select date field edit control 222c.

Figure 4F:
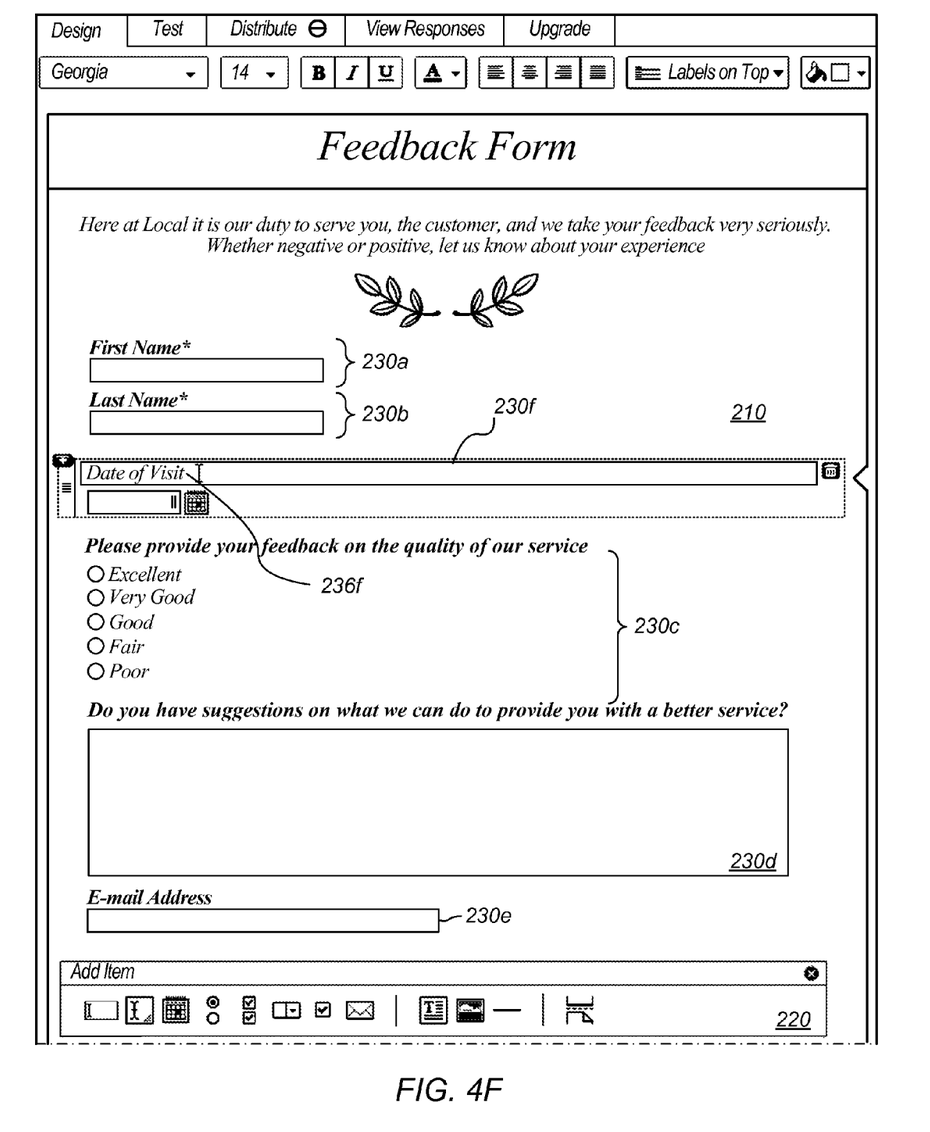
FIG. 4F illustrates one further use of the exemplary document authoring application depicted in FIG. 4E. A "Date Field" object has been added to the canvas above the single selection document object, with the notation "Date of Visit." The palette has been repositioned below the added "E-mail Address" text field object.

FIG. 4F illustrates insertion of date field object 230f to canvas 210, in response to the selection date field edit control 222c depicted in FIG. 4E. Date field object 230f is positioned above comment field object 230d, at or near the location at which palette 220 was positioned. Object field 236f is shown as being edited to add the annotation "Date of Visit." In accordance with the structure of the electronic document associated with canvas 210, palette 220 is relocated below e-mail address object 230e, which is the last document object of canvas 210. This placement of palette 220 is at or near the position of a next newly-added (e.g., non-inserted) document object in accordance with the document structure of this depicted exemplary embodiment.

Example Implementations

The document authoring application may in some embodiments be implemented by a non-transitory, computer-readable storage medium and one or more processors (e.g., CPUs and/or GPUs) of a computing device. The computer-readable storage medium may store program instructions executable by the computing device, using one or more processors, to cause the computing device to perform operations including displaying of a canvas associated with an electronic document having an associated structure, displaying a palette comprising a plurality of editing controls within the canvas, positioning the palette within the canvas based at least in part on the associated structure of the electronic document, adding a particular object to the canvas in response to receiving an indication of a selection of one of the plurality of editing controls of the palette, and repositioning the palette within the canvas based at least in part on the structure associated with the electronic document.

Figure 5:
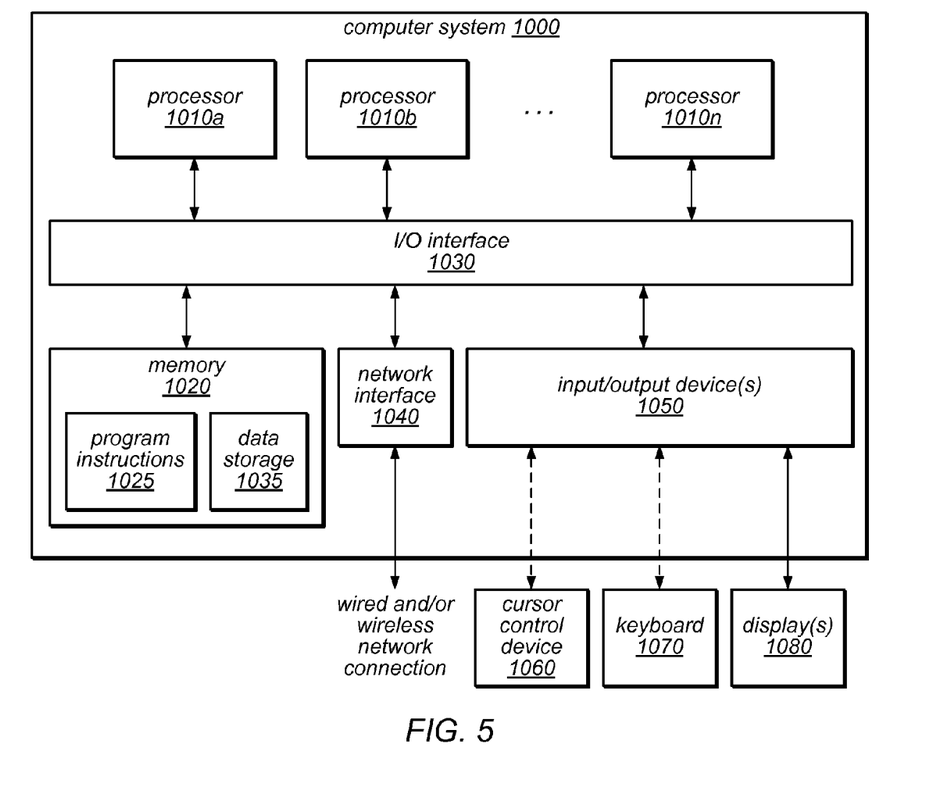
FIG. 5 illustrates an example computer system that may be used in some of the present embodiments.

FIG. 2 illustrates one embodiment of a document authoring module that may implement the techniques as described in FIGS. 1, 3, and 4A-4F. FIG. 5 illustrates an example computer system on which embodiments of an application 200, including document authoring module 240 may be implemented. Application 200 may be an application that facilitates creation of electronic documents such as, for example, web pages. Application 200 may allow creation of electronic documents by authors having creative expertise, but without expertise as to technical details that may be otherwise required for document authoring (e.g., expertise in coding of web pages using a markup language).

Application 200 may provide canvas 210 by way of document authoring module 240. In some embodiments, one or more other modules 254 may also be used as at least a part of providing one or more components of canvas 210. For example, some embodiments may include modules 254 providing localization functionality. Some embodiments, one or more modules 254 may provide access to libraries of objects 230 and/or controls 222 of palette 220.

Embodiments of application 200 may also include interface module 252, which may facilitate communication to receive user input 260. User input 260 may be received as an input from a pointing device, such as a mouse, trackball, touch pad, touch screen, or other input means. In some embodiments, user input 260 may include data received from one or more storage devices and/or other applications.

Application 200 may generate output 270 that includes one or more output canvas definitions 272. Canvas definitions 272 may, for example, be stored to a storage medium 296, such as system memory, a disk drive, DVD, CD, etc, and/or may be displayed to the display 292 of the device on which the application 200 is executing.

In some embodiments, canvas definitions 272 may be output to one or more other devices 294. For example, application 200 executing at a particular device may generate a canvas definition 272 that is subsequently output to another device, where that other device generates a web page or other electronic document based on canvas definition 272.

In some embodiments, application 200 may generate document 274, which may be based on the canvas definition. In such embodiments, output 270 may include the generated document 274. The document 274 may be stored to storage medium 296, displayed to display 292, and/or output to another device 294.

Example System

Embodiments of a document authoring module and/or of an application that implements the document authoring module or techniques as described herein may be executed on one or more computer systems, which may interact with various other devices. One such computer system is illustrated by FIG. 5. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 may further includes a wired and/or wireless network interface 1040 coupled to I/O interface 1030, and may include one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods and techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a local coordinate frame UI module and/or of an application that implements the local coordinate frame UI module or techniques are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touch pads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Those skilled in the art will appreciate that computer system 1000 is merely illustrative and is not intended to limit the scope of a document authoring module and/or of an application that implements the document authoring module or techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

The invention claimed is:

1. A method, comprising:
  displaying, at a computing device, a canvas associated with an electronic document, the electronic document having an associated structure defined by a markup language;
  displaying, at a first location within the canvas, a palette comprising a plurality of editing controls, including two or more controls corresponding to addition of displayable objects to the canvas, and the palette is positioned within the canvas based at least in part on the associated structure of the electronic document;
  responsive to receiving, at the computing device, an indication of a selection of one of the plurality of editing controls of the palette, automatically adding a particular displayable object that corresponds to the selected editing control and is defined by the markup language to the canvas at the first location without displaying technical details of the markup language for the particular displayable object; and responsive to said receiving the indication of the selection, automatically repositioning the palette to a second location within the canvas based at least in part on the structure associated with the electronic document.

2. The method of claim 1, wherein the second location within the canvas is adjacent to the first location.

3. The method of claim 2,
wherein the first location within the canvas is below other displayable objects that were included on the canvas prior to the adding the displayable particular object;
wherein the second location corresponds to a next location in accordance with the associated structure of the electronic document; and
wherein the repositioning the palette within the canvas is performed independent of cursor trajectory.

4. The method of claim 2, further comprising:
repositioning the palette at a third location within the canvas in response to receiving, at the computing device, an indication of a user selection indicating a previously added displayable object within the canvas.

5. The method of claim 4, further comprising:
modifying the indicated previously added displayable object in response to receiving, at the computing device, an indication of a selection of an editing control of the palette that specifies an updating operation.

6. The method of claim 4, further comprising:
adding an additional displayable object, within the canvas, adjacent to the indicated previously added displayable object in response to receiving, at the computing device, an indication of a selection of an editing control of the palette that corresponds to addition of displayable objects.

7. The method of claim 6, wherein the adding the additional displayable object includes positioning the additional displayable object at the third location and positioning the palette at a fourth location.

8. A computing device, comprising:
a processor;
an input device; and
memory having stored thereon instructions executable by the computing device, using the processor, to cause the computing device to perform operations comprising:
displaying a canvas associated with an electronic document, the electronic document having an associated structure defined by a markup language;
displaying, at a first location within the canvas, a palette comprising a plurality of editing controls, including two or more controls corresponding to addition of objects to the canvas, and the palette is positioned within the canvas based at least in part on the associated structure of the electronic document; and
responsive to receiving, at the computing device from the input device, an indication of a selection of one of the plurality of editing controls of the palette, automatically adding a particular object that corresponds to the selected editing control and is defined by a markup language to the canvas at the first location; and
responsive to said receiving the indication of the selection, automatically repositioning the palette to a second location within the canvas based at least in part on the structure associated with the electronic document and without dependency on a path followed by the input device.

9. The computing device of claim 8,
wherein the displaying the palette includes positioning the palette at a first location within the canvas;
wherein the adding the particular object to the canvas includes positioning the particular object at the first location, and
wherein the repositioning the palette within the canvas includes positioning the palette at a second location within the canvas that is adjacent to the first location.

10. The computing device of claim 9,
wherein the first location within the canvas is below other objects that were included on the canvas prior to the adding the particular object; and
wherein the second location corresponds to a next location in accordance with the associated structure of the electronic document.

11. The computing device of claim 9, wherein the operations further comprise:
repositioning the palette at a third location within the canvas in response to receiving an indication of a user selection indicating a previously added object within the canvas.

12. The computing device of claim 11, wherein the operations further comprise:
modifying the indicated previously added object in response to receiving an indication of a selection of an editing control of the palette that specifies an updating operation.

13. The computing device of claim 11, wherein the operations further comprise:
adding an additional object within the canvas adjacent to the indicated previously added object in response to receiving an indication of a selection of an editing control of the palette that corresponds to addition of objects.

14. The computing device of claim 13, wherein the adding the additional object includes positioning the additional object at the third location and positioning the palette at a fourth location.

15. A computer-readable storage medium having stored thereon instructions that, responsive to execution by a computing device, cause the computing device to perform operations comprising:
displaying a canvas associated with an electronic document, the electronic document having an associated structure defined by a markup language;
displaying, at a first location within the canvas, a palette comprising a plurality of editing controls, including two or more controls corresponding to addition of displayable objects to the canvas, and the palette is positioned within the canvas based at least in part on the associated structure of the electronic document;
responsive to receiving, using the input device, an indication of a selection of one of the plurality of editing controls of the palette, automatically adding a particular displayable object that corresponds to the selected editing control and is defined by the markup language to the canvas at the first location without displaying technical details of the markup language for the particular displayable object; and
responsive to said receiving the indication of the selection, automatically repositioning the palette to a second location within the canvas based at least in part on the structure associated with the electronic document.

16. The computer-readable storage medium of claim 15, wherein the second location within the canvas is adjacent to the first location.

17. The computer-readable storage medium of claim 16, wherein the first location within the canvas is below other displayable objects that were included on the canvas prior to the adding the particular displayable object;

wherein the second location corresponds to a next location in accordance with the associated structure of the electronic document; and wherein the repositioning the palette within the canvas is performed independent of cursor trajectory.

18. The computer-readable storage medium of claim 16, wherein the operations further comprise:

repositioning the palette at a third location within the canvas in response to receiving an indication of a user selection indicating a previously added displayable object within the canvas.

19. The computer-readable storage medium of claim 18, wherein the operations further comprise:

modifying the indicated previously added displayable object in response to receiving an indication of a selection of an editing control of the palette that specifies an updating operation.

20. The computer-readable storage medium of claim 18, wherein the operations further comprise:

adding an additional displayable object within the canvas adjacent to the indicated previously added displayable object in response to receiving an indication of a selection of an editing control of the palette that corresponds to addition of displayable objects.

21. The computer-readable storage medium of claim 20, wherein the adding the additional displayable object includes positioning the additional displayable object at the third location and positioning the palette at a fourth location.

\* \* \* \* \*